United States Patent [19]
Interrante et al.

[11] 3,821,358
[45] June 28, 1974

[54] CLOSED-CYCLE THERMOCHEMICAL PRODUCTION OF HYDROGEN AND OXYGEN

[75] Inventors: Leonard V. Interrante, Schenectady; Robert H. Wentorf, Jr., both of Schenectady, N.Y.

[73] Assignee: General Electric Company, N.Y.

[22] Filed: Feb. 1, 1973

[21] Appl. No.: 328,527

[52] U.S. Cl. .............................. 423/579, 423/657
[51] Int. Cl. ......................... C01b 13/00, C01b 1/02
[58] Field of Search .......... 423/579, 657, 497, 635, 423/493, 481, 500, 504

[56] References Cited
UNITED STATES PATENTS
1,763,781  6/1930  Heath et al. .................. 423/493
3,567,378  3/1971  Ferris ............................ 423/635

FOREIGN PATENTS OR APPLICATIONS
447,688  1/1913  France ........................... 423/657

Primary Examiner—Oscar R. Vertiz
Assistant Examiner—Hoke S. Miller
Attorney, Agent, or Firm—Leo I. Malossi; Joseph T. Cohen; Jerome C. Squillaro

[57] ABSTRACT

A process is disclosed for the multi-step closed-cycle thermochemical production of hydrogen and oxygen. Water is split into hydrogen and oxygen at separate stations by the use of copper compounds circulating in a sub-cycle, magnesium compound circulating in a sub-cycle and chlorine generated in the copper sub-cycle.

7 Claims, 1 Drawing Figure

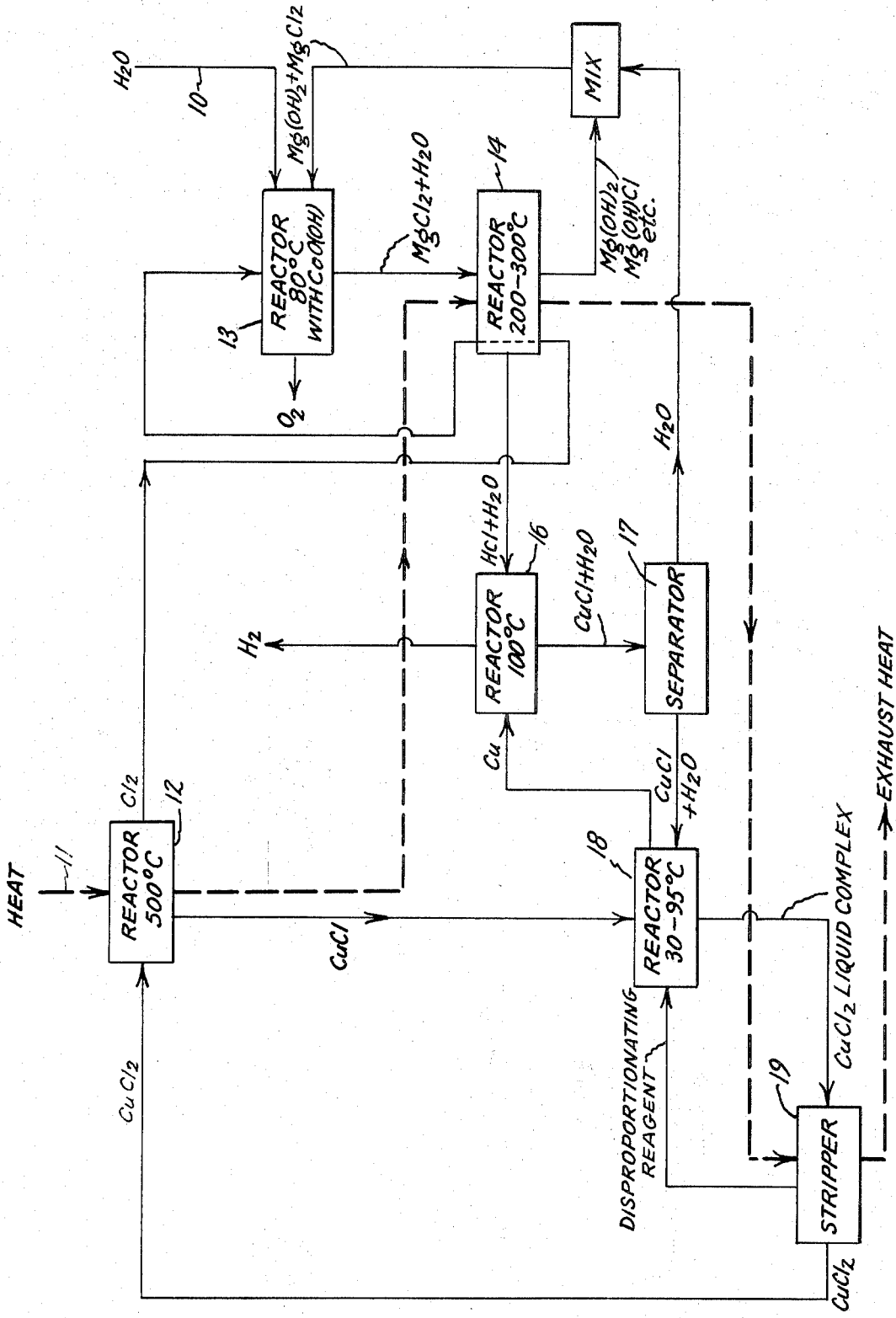

CLOSED-CYCLE THERMOCHEMICAL PRODUCTION OF HYDROGEN AND OXYGEN

BACKGROUND OF THE INVENTION

Concern has already been expressed that a major energy crisis is expected to occur in the United States in the next 10 to 15 years. Although the crisis may be alleviated by the massive import of oil and gas, such a solution would greatly aggravate the already serious problem of balance of payments faced by the United States. One far more desirable solution that has been proposed is the large scale production of hydrogen.

Hydrogen usage in the United States has grown at an average annual rate of 15 percent for the past 25 years. Large scale use of hydrogen is currently restricted to ammonia production (42 percent), hydrocarbon refining (38 percent), metallurgical (about 7 percent), and food processing (about 5 percent).

At least five methods for the production of hydrogen have reached a substantial level of usage:

a. natural gas reforming methods,
b. the reforming of petroleum napthas,
c. partial oxidation of hydrocarbons,
d. the reforming of coal or coke and
e. the electrolysis of water.

Of these methods, the reforming of natural gas is the most economical. Reformed gaseous industrial grade hydrogen is at present typically priced in the range 75–90¢/million Btu. However, the sharp rise in prices expected to occur for methane and similar petroleum products due to the pending massive shortage will scale this price up to a substantially higher value in the future.

It will be particularly desirable to provide new multi-step closed-cycle thermochemical processes in which, ideally, only heat and water are added to the system and hydrogen and oxygen are removed therefrom. The maximum operating temperature should not exceed about 800°C maximum value roughly equal to the temperature of steam deliverable by high temperature gas technology).

The Euratom thermochemical hydrogen process (referred to as the Mark I process) has been proposed as one such process. The Mark I process uses calcium, bromine, and mercury compounds to decompose water. The maximum temperature required has been indicated as being 727°C, the temperature attainable in the steam discharge from a high temperature gas reactor.

The Mark I process has major drawbacks including corrosion, the high cost of mercury and the volatility thereof. The loss of significant amounts of mercury to the atmosphere appears certain to occur in the course of repeated cycling adding to the expense of the process and creating a severe ecological hazard.

It is the prime object of this invention to provide an improved multi-step closed-cycle thermochemical process not only satisfactorily meeting the above thermodynamic constraints, but also meeting constraints relating to kinetics, ecological and safety factors, economics, reliability and material availability.

SUMMARY OF THE INVENTION

Cupric chloride (solid) is thermally decomposed at about 450°–550°C to yield cuprous chloride (solid) and chlorine gas. The chlorine gas is brought into contact with water or steam in the presence of magnesium hydroxide in a reactor at about 80°C in the presence of a catalyst [e.g., CoO(OH)]. Oxygen is liberated from this reaction and collected. The cuprous chloride is disproportionated to cupric chloride and copper used as follows. The copper is made to react with a mixture of hydrogen chloride and steam at a temperature of at least about 100°C, hydrogen being evolved from this reaction and collected. The cupric chloride is recirculated for thermal decomposition thereof to produce more chlorine and cuprous chloride. Ideally conducted, the process requires only the input of $H_2O$ and heat and results in the generation and discharge from the process of hydrogen and oxygen.

BRIEF DESCRIPTION OF THE DRAWING

The exact nature of this invention as well as other objects and advantages thereof will be readily apparent from consideration of the following specification relating to the annexed drawing schematically setting forth the flow diagram of the multi-step closed-cycle thermochemical process of this invention.

DESCRIPTION OF THE PREFERRED EMBODIMENT

Entry of water into the system is identified by arrow 10 and the heat input into the system is identified by dashed arrow 11. This heat input may be provided, for example, by the steam output from a nuclear reactor of the water-cooled, liquid metal or high temperature gas types. After heating reactor 12, the heat input stream is used for further heating at other stages in the process as shown.

Broadly stated, copper salts, magnesium compounds and chlorine in various forms are utilized in the process to decompose water to result in the release of hydrogen and oxygen at separate stations in the process. The copper and magnesium circulate in sub-cycles as will be described hereinbelow, while chlorine makes the full circuit.

Beginning with reactor 12, cupric chloride is thermally decomposed (about 450°–550°C) according to the reaction:

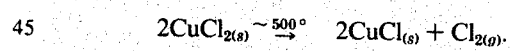

Chlorine gas from reactor 12 is conducted to reactor 13 (after releasing some of its heat to reactor 14), being admitted thereto together with water and a slurry of magnesium hydroxide, water and catalyst. Within reactor 13 in the presence of the catalyst, e.g., cobalt hydroxide, CoO(OH), the following set of reactions occur:

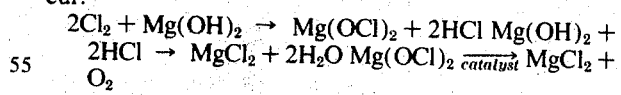

Oxygen generated in this reaction system is liberated and collected, and the magnesium chloride formed in reactor 13 is hydrolyzed in reactor 14 at a temperature in the 250°–350°C range to produce magnesium oxide, hydroxide, hydroxy-chloride, etc., (that is recirculated with the accompanying catalyst and added water to reactor 13) and a gaseous mixture of hydrogen chloride and steam. As the temperature of the slurry of magnesium compounds decreases, the predominate magnesium compound in the slurry reaching reactor 13 is $Mg(OH)_2$. The hydrogen chloride and steam mixture leaving reactor 14 is conducted to reactor 16, where it is brought into contact with copper recirculated thereto as will be described hereinbelow. The following reaction proceeds at about 100°C or higher:

$$Cu_{(s)} + HCl_{(g)} \rightarrow CuCl_{(s)} + \tfrac{1}{2} H_{2(g)}.$$

Alternatively, the same reaction can be carried out using concentrated, aqueous hydrochloric acid.

The cuprous chloride formed, together with excess $H_2O$, is conducted to separator 17, where some of the water condenses, is removed, and is recirculated as shown for mixing with the magnesium oxide, hydroxide, hydroxy chloride, etc. leaving reactor 14. Cuprous chloride from the reaction in reactor 12 and the cuprous chloride/water slurry from separator 17 are conducted to reactor 18, where in the presence of a reagent which removes the cupric chloride from the mixture of cuprous chloride and copper, disproportionation of the cuprous chloride is promoted. The temperature employed in reaction 18 depends on the particular disproportionation reagent used. The temperature should not exceed the decomposition temperature of the cupric chloride/reagent combination or the stability or evaporating tendency of the reagent. For example, using ethylenediamine, a suitable temperature range to be used is 30°–95°C. A suitable bidentate ligand supplying the requisite organic chelating group is one that (a) will complex the Cu(II) ion much more strongly than it will complex the Cu(I) ion and that (b) is sufficiently volatile to permit removal thereof as an unchanged material from the Cu(II) ion in the stripping process. The former criterion can, in many instances, be satisfied from the literature while the ability of the material to meet the second criterion can be determined by forming the complex (a chelate) and heating it. If the original complexing reagent is recovered directly, the criterion is met. Useful complexing reagents in addition to ethylenediamine are 1,3-propanediamine, 1,2-propanediamine and 2,3-butanediamine.

Other useful disproportionation reagents are water (with some HCl present to control acidity):

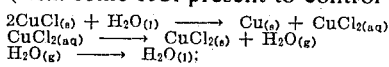

and hydrogen ion exchange resin:

When using ion exchange resins, the CuCl is extracted with water and the stream is passed through a bed of the resin.

Referring once more to the drawing, after disproportionation of the cuprous chloride in reactor 18, the copper produced is recirculated to reactor 16 as noted above for the reaction with HCl. The resulting $CuCl_2$ (as a solid complex or in aqueous solution, depending upon the disproportionation reagent) is conducted to stripper 19. In stripper 19 the complexing agent (or water) is removed and recirculated to reactor 18, while the cupric chloride is recirculated to reactor 12.

In the case of solid complexed $CuCl_2$ the stripping is accomplished by heating above the decomposition temperature of the complex. For example, with ethylenediamine as the reagent, the stripping temperature would be approximately 300°C. Heating would also be employed for the stripping operation, when the $CuCl_2$/reagent is in aqueous solution as is the case in the use of water or ion exchange resin as the reagent.

Although the reference herein has been to the use of chlorine compounds of copper, analogous bromine compounds may also be employed. Chlorine is the preferred halogen.

What we claim as new and desire to secure by Letters Patent of the United States is:

1. The process for generation of hydrogen and oxygen from water comprising the steps of:
   a. decomposing cupric halide at a temperature of at least about 500°C to produce solid cuprous halide and halogen, the halogen being selected from the group consisting of chlorine and bromine,
   b. removing the halogen formed during said decomposition,
   c. bringing the halogen into contact with $H_2O$ and magnesium hydroxide in the presence of a catalyst at a temperature in the range of from about 25° to about 95°C to produce magnesium halide,
   d. removing and collecting the oxygen liberated in the halogen/$H_2O$ reaction,
   e. hydrolyzing the magnesium halide formed hereinabove in the presence of water at a temperature in the range of from about 250° to about 350°C to form a product containing magnesium hydroxide and to release a gas mixture containing hydrogen halide and $H_2O$,
   f. reacting said gas mixture with copper at a temperature of at least about 100°C to produce hydrogen and cuprous halide,
   g. removing and collecting said hydrogen,
   h. disproportionating the cuprous halide formed in the reactions recited hereinabove,
   i. removing copper resulting from said disproportionation for conduct of the aforementioned copper/HCl reaction,
   j. recovering cupric halide from said disproportionation products and
   k. decomposing said cupric halide as recited in step (a).

2. The process of claim 1 wherein the disproportionation of the cuprous halide occurs in the presence of a quantity of a material containing an organic chelating group.

3. The process of claim 2 wherein the halogen is chlorine and the material containing an organic chelating group is ethylenediamine.

4. The process of claim 1 wherein the halogen is chlorine and the disporportionation of the CuCl occurs in the presence of a hydrogen ion exchange resin.

5. The process of claim 1 wherein the halogen is chlorine and the disproportionation of the CuCl occurs in the presence of water and HCl.

6. The process of claim 1 wherein the catalyst introduced for the halogen/$H_2O$ reaction is selected from the group consisting of cobalt salts and nickel salts.

7. The process of claim 2 wherein the halogen is chlorine and the material containing an organic chelating group is 1,3-propanediamine.

* * * * *